(12) United States Patent
Boyer (10) Patent No.: US 12,092,486 B2
(45) Date of Patent: Sep. 17, 2024

(54) FLOW GAUGE AND FLOW GAUGE SCALE ASSEMBLY

(71) Applicant: The ESAB Group Inc., Annapolis Junction, MD (US)

(72) Inventor: Robert Boyer, Flower Mound, TX (US)

(73) Assignee: THE ESAB GROUP INC., North Bethesda, MD (US)

(*) Notice: Subject to any disclaimer, the term of this patent is extended or adjusted under 35 U.S.C. 154(b) by 0 days.

(21) Appl. No.: 17/550,375

(22) Filed: Dec. 14, 2021

(65) Prior Publication Data

US 2023/0184570 A1  Jun. 15, 2023

(51) Int. Cl.
*G01D 13/16* (2006.01)
*G01F 1/22* (2006.01)

(52) U.S. Cl.
CPC .............. *G01D 13/16* (2013.01); *G01F 1/22* (2013.01)

(58) Field of Classification Search
CPC .......... G01F 1/22; G01D 13/02; G01D 13/12; G01D 13/16; G01D 13/00
See application file for complete search history.

(56) References Cited

U.S. PATENT DOCUMENTS

| 2,432,605 | A | | 12/1947 | Barach | |
|---|---|---|---|---|---|
| 2,882,725 | A | * | 4/1959 | Goodhue | G01F 1/22 73/861.55 |
| 3,066,530 | A | * | 12/1962 | Stenberg | G01F 1/22 73/861.55 |
| 5,515,734 | A | * | 5/1996 | Malminen | G01P 5/08 73/861.46 |
| 6,915,706 | B2 | * | 7/2005 | Rousselin | G01F 1/22 73/861.57 |
| 10,690,527 | B2 | * | 6/2020 | Dennison | G01F 15/14 |
| 2013/0204225 | A1 | | 8/2013 | Creaturo | |

FOREIGN PATENT DOCUMENTS

| CN | 106813725 A | * | 6/2017 |
|---|---|---|---|
| DE | 7730466 U1 | | 4/1978 |
| GB | 1251425 A | * | 10/1971 |
| JP | H08334395 A | | 12/1996 |
| JP | 4242955 B2 | * | 3/2009 |

OTHER PUBLICATIONS

"Industrial Gas Equipment Catalog" by Victor; 2012 (Year: 2012).*
ESAB, "HRF 2400 Series Flow Meter", https://www.esabna.com/us/en/products/gas-equipment/industrial/gas-control/cylinder/flow-gauge-meter/hrf-2400-series-flow-meter.cfm, downloaded Dec. 14, 2021, 3 pages.
Notification of Transmittal of International Search Report and Written Opinion including International Search Report and Written Opinion for International Application No. PCT/US2022/051053 mailed Apr. 18, 2023, 16 pages.

* cited by examiner

*Primary Examiner* — Justin N Olamit
(74) *Attorney, Agent, or Firm* — Edell, Shapiro & Finnan, LLC (57) ABSTRACT

A flow gauge scale assembly includes a first scale and a second scale. The first scale is configured to be disposed in a first radial position on a generally cylindrical flow tube through which a ball can move to indicate a flow rate of a flow of gas. The second scale is configured to be disposed in a second radial position that will be at least partially optically misaligned from the first scale when the flow gauge scale assembly is installed in the generally cylindrical flow tube.

18 Claims, 7 Drawing Sheets

FLOW GAUGE AND FLOW GAUGE SCALE ASSEMBLY

TECHNICAL FIELD

The present disclosure is directed toward gas regulation and, in particular, toward a flow gauge scale assembly that provides a clear indication of a flow rate of gas moving through a gas regulation apparatus.

BACKGROUND

Some gas regulators, e.g., flow gauge regulators or hybrid regulators, output an input gas at a specific flow rate. For example, typically, a flow gauge outputs a specific flow rate when a specific pressure is generated inside the regulator. The gauge on the flow gauge regulator provides an indication of the flow rate (e.g., in cubic feet per hour (CFH)). In some instances, flow gauge regulators use a dial gauge, but in other instances, a ball gauge. With ball gauges, pressure inside the regulator causes the ball to float up within the gauge to align with markings on the gauge to provide an indication of the flow rate.

SUMMARY

In some aspects, the techniques described herein relate to a flow gauge including a generally cylindrical flow tube, a ball, a first scale disposed on the generally cylindrical flow tube, and a second scale disposed on the generally cylindrical flow tube in a position that is at least partially optically out of phase from the first scale. The generally cylindrical flow tube extends from a first end to a second end and the first end is fluidly coupled to a flow path through a regulator or flowmeter while the ball that is movable within the generally cylindrical flow tube in response to a flow of gas moving along the flow path. Advantageously, since the first scale and the second scale are at least partially optically out of phase, each scale is legible, uncluttered, and/or unobstructed. This will improve the readability of the scales, which, in turn, will improve the accuracy of gas flow rate readings.

In some aspects, the flow rate indicia of the first scale spans a first radial zone of the generally cylindrical flow tube, and flow rate indicia of the second scale spans a second radial zone of the generally cylindrical flow tube that is angularly offset from a direct field of view of the first radial zone. This ensures the most important portion of the scales—the flow rate indicia—is legible, uncluttered, and/or unobstructed. Additionally or alternatively, an interior edge of the flow rate indicia of the first scale may be angularly offset around the generally cylindrical flow tube from an interior edge of the flow rate indicia of the second scale by an angle in a range of approximately 30 degrees to approximately 150 degrees. Such an angular offset may also ensure the scales are optically out of phase, and, thus, are legible, uncluttered, and/or unobstructed.

In some instances, the flow rate indicia of the first scale are identical to flow rate indicia of the second scale. Additionally or alternatively, the flow rate indicia of the first scale can include a first range of values incremented at a first interval and flow rate indicia of the second scale can include a second range of values incremented at a second interval. Still further, in some aspects, the first scale is for a first gas or first combination of gases and the second scale is for a second gas or second combination of gases. Thus, two optically of phase scales may ensure the regulator is easy to use and accurate across a wide range of gases and/or use cases.

Still further, in some instances, the first scale and the second scale are included on a translucent applicator. For example, the translucent applicator could include an insert that is rotatable within the generally cylindrical flow tube. Alternatively, the translucent applicator could be fixed to the generally cylindrical flow tube. These options could simplify switching between the scales and/or prevent the scales from unwantedly moving out of place.

In at least some embodiments, the first scale includes first flow rate indicia, first major scale increments, and first minor scale increments; and the first flow rate indicia are disposed between the first major scale increments and laterally offset from the first minor scale increments. Furthermore, in at least some embodiments, the first major scale increments and the first minor scale increments are configured to provide a flow reading when a top of the ball is aligned therewith. Still further, in addition to or in lieu of the foregoing aspects, the second scale may include second flow rate indicia, second major scale increments, and second minor scale increments; and the second flow rate indicia may be disposed between the second major scale increments and laterally offset from the second minor scale increments. Each of these features, alone or in combination with other features, may further assist in providing a legible, uncluttered, and/or unobstructed scale.

Further, in some embodiments, the first scale further includes first reading instructions that are oriented in an orientation that matches an orientation of the first flow rate indicia. For example, the first reading instructions may include: text positioned between the first scale and the second scale; and one or more first symbols positioned above the first flow rate indicia, the first major scale increments, the first minor scale increments, or a combination thereof. Additionally or alternatively, the second scale may include second reading instructions including: the text positioned between the first scale and the second scale; and one or more second symbols positioned above second flow rate indicia included in the second scale, second major scale increments included in the second scale, second minor scale increments included in the second scale, or a combination thereof. Again, each of these features, alone or in combination with other features, may further assist in providing a legible, uncluttered, and/or unobstructed scale or scales.

In further aspects, the present application is drawn to a flow gauge scale assembly including a first scale and a second scale. The first scale is configured to be disposed in a first radial position on a generally cylindrical flow tube through which a ball can move to indicate a flow rate of a flow of gas. The second scale configured to be disposed in a second radial position that will be at least partially optically misaligned from the first scale when the flow gauge scale assembly is installed in the generally cylindrical flow tube. At least because the scales will be at least partially optically misaligned, each scale will be legible, uncluttered, and/or unobstructed. This will improve the readability of the scales, which, in turn, will improve the accuracy of gas flow rate readings. In different embodiments, the flow gauge scale assembly may include, and realize the advantages of, any of the features discussed above in connection with the scales of the regulator.

Further advantages and features are also described herein and the foregoing aspects and features, as well as the advantages thereof, should not be construed to limit the features that may be included in and/or the advantages that may be realized by the techniques presented herein.

BRIEF DESCRIPTION OF THE SEVERAL VIEWS OF THE DRAWINGS

Like numerals identify like components throughout the figures.

DETAILED DESCRIPTION

A flow gauge scale assembly and a regulator including the same (also referred to as a "flowmeter") are described and presented herein. The regulator is a flow gauge regulator that can measure and/or control the flow rate of gas passing therethrough. The flow gauge of this regulator is a ball-style gauge (i.e., a "ball gauge") and, to improve the readability of this gauge, the flow gauge scale assembly includes optically misaligned scales. That is, the flow gauge assembly includes two scales disposed on a transparent, generally cylindrical flow tube and the scales are positioned to be optically out of phase from each other. Notably, the tube is transparent so that user can see where the ball of the ball gauge aligns with one of the scales and, now, with the flow gauge assembly, a user will be able to read one of the scales without the other scale interfering or obscuring that scale. That is, when a user reads one of the scales included in the flow gauge scale assembly, the other scale (or scales) will be out of the user's line of sight. Consequently, the user will be able to easily and accurately read the scale in-use.

By comparison, many conventional flow gauge scales align two scales on opposite sides of a tube (i.e., in each other's direct field of view), creating a cluttered look that is hard to read. When the scales are cluttered, occluded, or otherwise hard to read, it becomes difficult for a user to accurately measure the flow rate of gas exiting the regulator, which may negatively affect downstream operations, for example, if downstream operations require a precise flow rate and/or if incrementally higher flow rates cause increased wear and/or quicker consumption.

Figure 1:
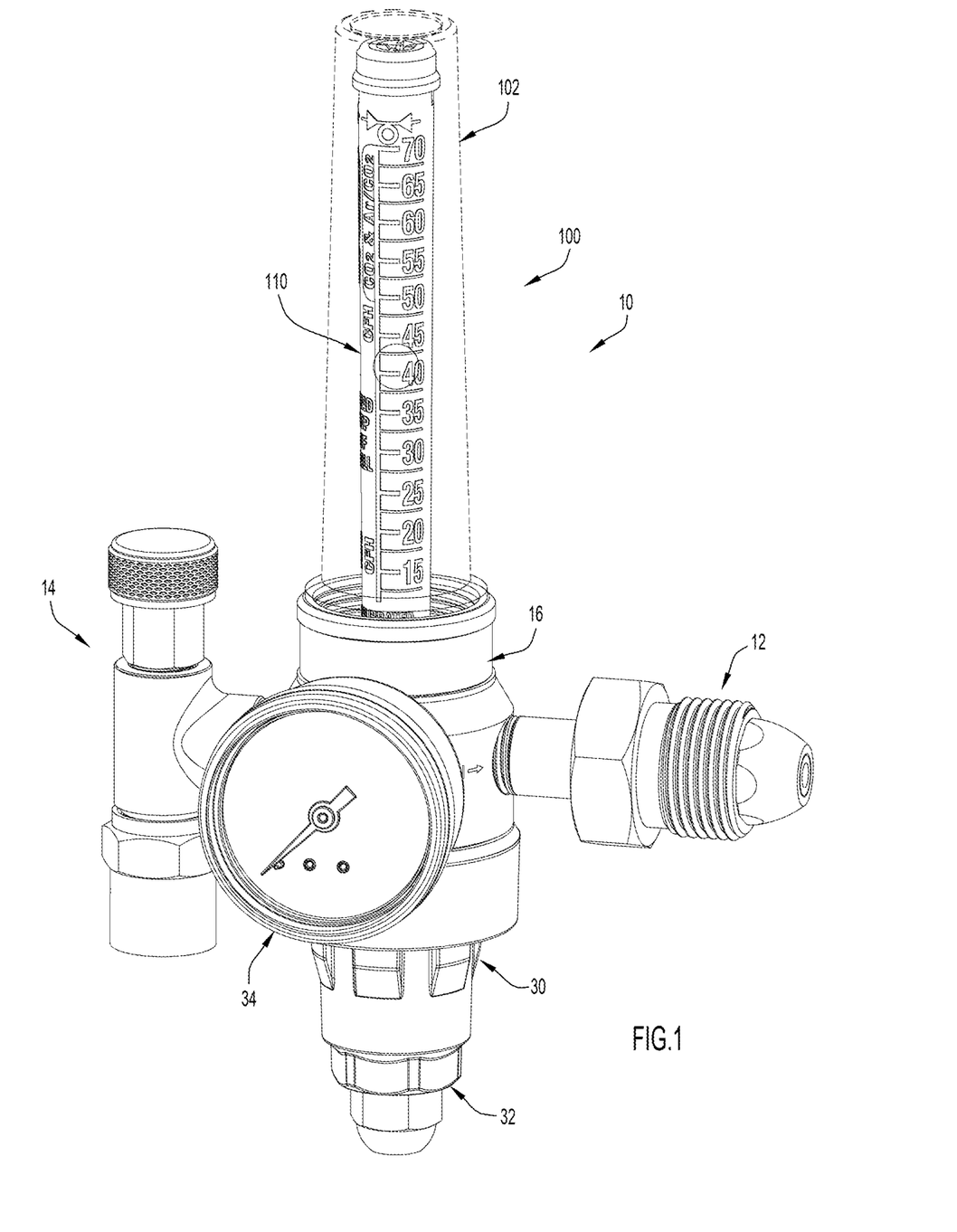
FIG. 1 is a front perspective view of a flow gauge regulator with the flow gauge scale assembly presented herein, according to an example embodiment.
Figures 2, 3:
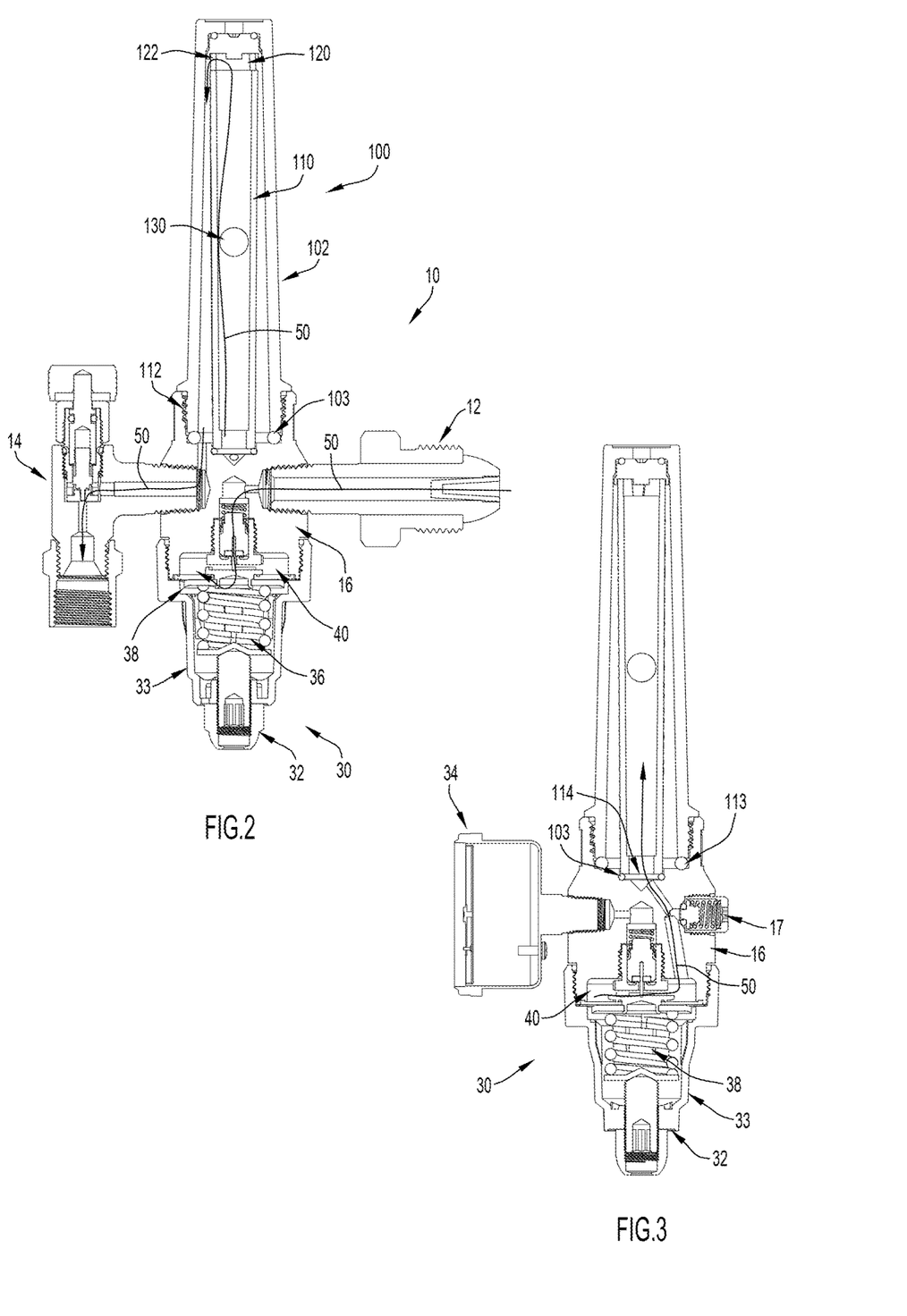
FIG. 2 is a front, sectional view of the flow gauge regulator of FIG. 1.
FIG. 3 is a side, sectional view of the flow gauge regulator of FIG. 1.

FIGS. 1-3 depict a front perspective view, a front, sectional view, and a side, sectional view, respectively, of an example embodiment of a regulator 10 (again, also referred to as flowmeter 10). The regulator 10 includes a regulator body 16, an inlet 12, an outlet 14, an adjustment mechanism 30, and a flow gauge 100. As can be seen in FIGS. 1 and 2, in the depicted embodiment, the outlet 14 is oriented to expel gas at a direction that is 90 degrees offset from the direction in which inlet 12 (i.e., a central axis of the inlet 12 is perpendicular to a central axis of the outlet 14); however, this is merely an example and, in other embodiments, the outlet 14 may be oriented in any position with respect to the inlet 12. For example, the outlet 14 and inlet 12 may be aligned on the same central axis or include parallel central axes.

Regardless of the orientation or arrangement of the inlet 12 and outlet 14, the regulator body 16 generally includes one or more pathways that allow high-pressure gas received from the inlet 12 to flow to the outlet 14. The regulator body 16 may throttle the high-pressure gas as it passes therethrough to achieve a specific flow rate and the throttling may be controlled by the adjustment mechanism 30. In the depicted embodiment, the regulator also includes a safety valve 17 (see FIG. 3) that is configured to relieve pressure in the regulator body 16 if absolutely necessary (i.e., to prevent catastrophic failure); however, other embodiments need not include a safety valve 17. The regulator body 16 also supports one or more gauges. In the particular embodiment shown in FIGS. 1-3, the regulator body 16 supports two gauges: an inlet gauge 34 and the flow gauge 100. The inlet gauge 34 is a dial-style gauge that is configured to indicate the pressure of high-pressure gas flowing into the regulator body 16 via the inlet 12. Meanwhile, and as is explained in further detail below, the flow gauge 100 measures the flow rate of gas flowing towards and/or out of the outlet 14. That is, flow gauge 100 provides an indication of the flow rate of gas exiting the regulator 10 via the outlet 14 (i.e., gas flowing into a downstream gas line to which the regulator is connected).

To be clear, the depicted inlet 12, regulator body 16, outlet 14, and adjustment mechanism 30 are merely examples and, in other embodiments, the flow gauge 100 presented herein may be installed onto any regulator body 16, with any inlet 12, outlet 14, and/or adjustment mechanism 30 in order to improve the readability of the flow gauge 100 which, in turn, may improve the accuracy and operability of the regulator 10. Likewise, the flow gauge scale 200 presented herein can be included on any ball-style flow gauge 100 configured to be installed on any flow regulator (i.e., flowmeter). However, for completeness, the depicted inlet 12, regulator body 16, and adjustment mechanism 30 are now each briefly described.

First, the inlet 12 includes a main body that defines an internal channel. The channel may have a selectively openable valve at its distal end (i.e., the end distal from the regulator body 16 that can be attached to a cylinder or tank). The inlet 12 also includes an opening (with or without a valve) at its proximate end (i.e., the end proximate to the regulator body 16) that allows gas (typically high-pressure gas) to flow into the regulator body 16. The inlet 12 may also include threads, or any other mating feature, to allow the inlet 12 to be safely secured to an upstream gas line or gas source.

Second, the regulator body 16 includes a main body that defines channels that allow gas from the inlet 12 to flow to the outlet 14 via gas flow path 50, as mentioned above. Additionally, the regulator body 16 includes or defines a seat that, together with portions of the adjustment mechanism 30 (which are described in further detail below), defines a throttle chamber 40. As is implied by the name, the adjustment mechanism 30 can adjust one or more dimensions, such as the height (insofar as "height" refers to the vertical dimension shown in the drawings), of the throttle chamber 40 to throttle the flow of high pressure gas from the inlet 12 before the gas reaches the outlet 14.

Third, and finally, the adjustment mechanism 30 includes a graspable portion 32 that can be rotated or spun by a user in order to actuate the adjustment mechanism 30. The graspable portion 32 is movably mounted on a fixed portion 33 that is fixedly coupled to the regulator body 16 (e.g., via threading). More specifically, the graspable portion 32 can be moved longitudinally (again, insofar as "longitudinally" refers to the vertical dimension shown in the drawings) along the fixed portion 33 (as it is rotated) so that actuation (i.e., rotation) of the graspable portion 32 moves the graspable portion 32 towards or away from the regulator body 16.

When the graspable portion 32 moves towards the regulator body 16, an actuating assembly included in or coupled to the graspable portion 32 compresses a biasing member 36, which, in turn, exerts a lateral force on a piston and/or diaphragm 38. The piston/diaphragm 38 transfers this lateral force to a stem, which acts against a chamber poppet to adjust a dimension (i.e., the height) of the throttle chamber 40. More simply, actuating the adjustment mechanism 30 opens (i.e., enlarges or moves out of a closed position) or closes (i.e., shrinks or shuts off) pathways through the regulator body 16 in order to control the throttling of gasses flowing there through on gas flow path 50. In some embodiments, the adjustment mechanism 30 may also include a diaphragm chamber, into which a portion of the gas flowing through regulator body 16 may flow to balance the forces exerted by or on the adjustment mechanism 30.

Now turning specifically to FIGS. 2 and 3, but with continued referenced to FIG. 1, these Figures provide sectional views that collectively illustrate a gas flow path 50 through the regulator 10. First, FIG. 2 provides a front, sectional view of the regulator 10 that bisects the inlet 12 and the outlet 14, as well as the regulator body 16, adjustment mechanism 30, and the flow gauge 100. Thus, this view shows that gas moving along gas flow path 50 enters the regulator 10 via inlet 12 and flows into the adjustment mechanism 30. This view also shows that gas moving along gas flow path 50 flows from the flow gauge 100 into the outlet 14 on its way to exiting the regulator 10. Next, FIG. 3 provides a side, sectional view of the regulator 10 that bisects the body 16, the flow gauge 100, and adjustment mechanism 30, without showing the inlet 12 or outlet 14. This view fills in the gap in FIG. 2, illustrating how the gas flow path 50 moves from the adjustment mechanism 30 to the flow gauge 100.

Notably, between the adjustment mechanism 30 and the outlet 14, the gas flow path 50 flows in two directions within the flow gauge 100. To facilitate this, and as can be seen in FIGS. 1-3, the flow gauge 100 includes a two-housing or two-body construction. That is, the flow gauge 100 includes an outer housing 102 and a generally cylindrical flow tube 110 disposed within the outer housing 102. With this construction, gas entering the flow gauge 100 (along gas flow path 50) flows through the generally cylindrical flow tube 110 in a first direction, exits the generally cylindrical flow tube 110, and then flows around the generally cylindrical flow tube 110 in an second direction that is opposite to the first direction.

More specifically, when gas flowing along gas flow path 50 enters the flow gauge 100, it enters the generally cylindrical flow tube 110 at a first end 112 of the generally cylindrical flow tube 110, which is fluidly coupled to the portion of the gas flow path 50 extending through the adjustment mechanism 30. Then, the gas flows towards a second end 120 of the generally cylindrical flow tube 110, pushing a ball 130 that is floatingly disposed in the generally cylindrical flow tube 110 from the first end first end 112 towards the second end 120. As the gas pushes the ball 130 towards the second end 120, gas will pass around the ball 130 and exit the second end 120 via one or more ports 122 (see FIG. 2) disposed in, disposed adjacent to, and/or defined by the second end 120 of the generally cylindrical flow tube 110. Then, the gas flow reverses directions and flows back towards the regulator body 16 between the generally cylindrical flow tube 110 and the outer housing 102.

Gas can flow between the regulator body 16 and flow gauge 100 in two directions because the generally cylindrical flow tube 110 and the outer housing 102 each define separate gas channels/interfaces with the regulator body 16. In the depicted embodiment, the channel/interface between the outer housing 102 and the regulator body 16 is an annular opening between an annular seal 103 (e.g., an O-ring) and the generally cylindrical flow tube 110, as shown in FIG. 2. Meanwhile, the channel/interface between the generally cylindrical flow tube 110 and the regulator body 16 is an ovular (e.g., circular) opening interiorly of an annular seal 113 (e.g., an O-ring) that is disposed between the generally cylindrical flow tube 110 and the regulator body 16, as shown in FIG. 3. Moreover, in the depicted embodiment, the channel/interface between the generally cylindrical flow tube 110 and the regulator body 16 includes a screen 114 to filter gas entering the flow gauge 100, protecting the flow gauge 100 and the outlet 14, as well as any downstream equipment, from at least some particulates and contaminates.

Figure 4:
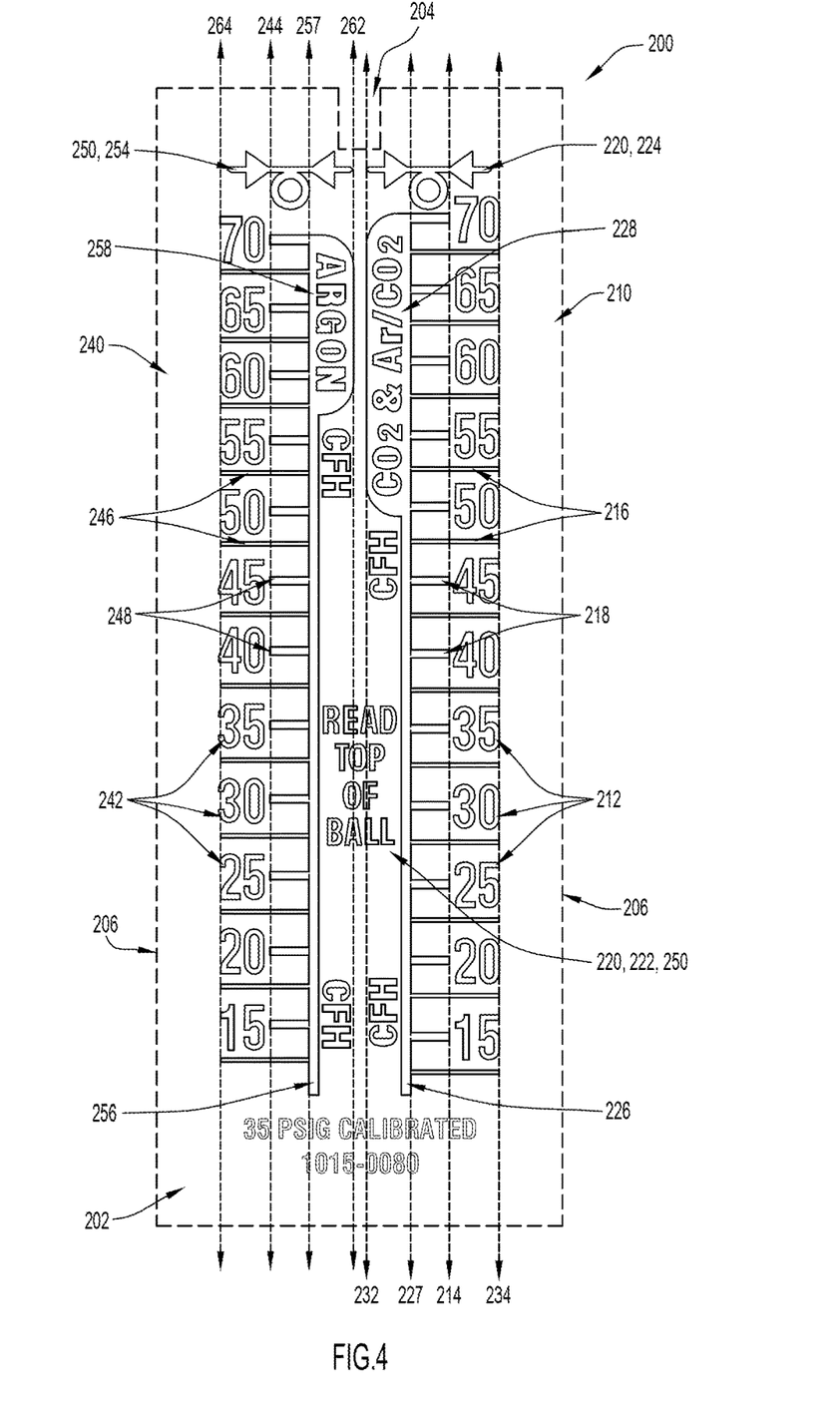
FIG. 4 is a front view of a flow gauge scale assembly presented herein prior to installation in a flow gauge, according to an example embodiment.

Now turning to FIG. 4, as mentioned, the flow gauge 100 includes a gauge scale assembly 200 that is optically advantageous at least because it includes out of phase scales. In some instances, the flow gauge 100 is included on an applicator 202 that is installable in or on the generally cylindrical flow tube 110. For example, the gauge scale assembly 200 may be printed on a translucent sticker, translucent insert, or other such applicator, which could be installed in or on the generally cylindrical flow tube 110. Alternatively, the gauge scale assembly 200 may be formed directly on the generally cylindrical flow tube 110 with additive or subtractive techniques (e.g., printed, etched, or otherwise marked). Thus, in FIG. 4, the gauge scale assembly 200 is shown on an applicator 202 in dashed lines (showing this to be optional).

Nevertheless, when the gauge scale assembly 200 is provided on an applicator 202, the applicator 202 may include one or more notches 204 configured to align with one or more ports 122 included on the generally cylindrical flow tube 110. Additionally, the applicator 202 may include lateral edges 206 that are configured to be spaced apart or abutting when the applicator 202 is applied to and/or installed within a generally cylindrical flow tube 110. Additionally or alternatively, in at least some embodiments, the applicator 202 may be an insert that is rotatable within the generally cylindrical flow tube. However, in other embodiments, the translucent applicator 202 could be fixed to the generally cylindrical flow tube 110. In at least some of these embodiments, the generally cylindrical flow tube 110 could be rotatable with respect to the regulator 10 to which it is attached. Any rotation, whether achieved with the generally cylindrical flow tube 110 or an applicator 202, allows a user to easily view any scale included in the gauge scale assembly 200 without turning or otherwise manipulating the entire regulator 10. However, this rotation is not necessary and other embodiments may include a gauge scale assembly 200 that is fixedly coupled to a stationary flow tube 110 (and the user or the regulator would need to move to use different scales included on the gauge scale assembly 200).

Regardless of how the gauge scale assembly 200 is provided (e.g., on an applicator 202 or directly on generally cylindrical flow tube 110), the gauge scale assembly 200 includes a first scale 210 that is out of phase with a second scale 240, or at least partially out of phase with the second scale 240. The "out of phase" arrangement is discussed in further detail below in connection with at least FIG. 6, but first, the scales included in the depicted embodiment are explained in detail.

First, the first scale 210 has overall lateral dimensions that extend from an interior edge 232 to an exterior edge 234. Within those lateral boundaries, flow rate indicia 212, major scale increments 216, and minor scale increments 218 extend longitudinally. More specifically, the first flow rate indicia 212 are disposed between the first major scale increments 216 and laterally offset from the first minor scale increments 218. That is, the major scale increments 216 extend above and below the flow rate indicia 212 while the minor scale increments 218 are disposed between the major scale increments 216 and extend towards a mid-section of the flow rate indicia 212. With this positioning, the flow rate indicia 212 are disposed closest to the exterior edge 234, such that an interior lateral edge 214 of the flow rate indicia 212 is disposed exteriorly of an interior lateral edge 227 of increments 216 and 218. However, to be clear, the interior lateral edge 214 of the flow rate indicia 212 and the interior lateral edge 227 of increments 216 and 218 are both disposed between the overall lateral boundaries of the first scale 210 defined by interior edge 232 and exterior edge 234. Thus, the flow rate indicia 212 and the increments (increments 216 and 218) each span a portion (i.e., a subset) of a radial zone defined by the first scale when the first scale 210 is installed in or on a generally cylindrical flow tube 110, with the flow rate indicia 212 spanning a smaller portion than increments 216 and 218.

In the depicted embodiment, the flow rate indicia 212 are numbers representative of a flow rate (e.g., cubic foot per hour (CFH)) of gas moving through a regulator in which the gauge scale assembly 200 is included. Meanwhile, the major scale increments 216 and the minor scale increments 218 are lines that extend transversely with respect to the lateral edges 232 and 234 of the first scale 210, with the major scale increments 216 being thicker than the minor scale increments 218 in the depicted embodiment. Notably, by positioning the flow rate indicia 212 between and beside the major scale increments 216 and the minor scale increments 218, respectively, the flow rate indicia 212 are relatively uncluttered or unobstructed and, thus are easier to read.

Moreover, in the depicted embodiment, the major scale increments 216 and the minor scale increments 218 extend from a baseline 226. In the depicted embodiment, a label 228 is included in or connected to the baseline 226 to provide an indication of the gas for which the scale 210 is intended (e.g., carbon dioxide ($CO_2$) and/or a mixture or Argon (Ar) and $CO_2$). The text of label 228 is arranged longitudinally on the first scale 210 (e.g., a reading direction of the label 228 is parallel to the direction in which the lateral edges 232 and 234 of the first scale 210 extend). This ensures that the first scale 210 can be contained in a small lateral space (e.g., a small radial zone once the scale 210 is applied to a generally cylindrical flow tube 110). By comparison, reading instructions 220 included on or with the first scale 210 are oriented in an orientation that matches an orientation of the first flow rate indicia 212 to ensure that the instructions are clear and easy to read.

More specifically, in the depicted embodiment, the reading instructions 220 include text 222 disposed laterally beside the baseline 226 and a symbol 224 disposed above the flow rate indicia 212, the major scale increments 216, and the minor scale increments 218. The text 222, which is oriented in the same orientation as the first flow rate indicia 212, indicates that the first scale 210 should be read by reading the top of the ball (i.e., the ball gives a flow rate measurement based on where the top of the ball hits one of the increments of the first scale 210). Likewise, the symbol 224 provides a pictorial version of this instruction, with a circle disposed below a line representing the way in which the first scale 210 should be read. Notably, for the purposes of this application, the text 222 may be referred to as part of the first scale 210, part of the second scale 240, or both. However, in other embodiments, reading instructions 220 could include any text or symbol located in any location, either in addition to or in lieu of the depicted reading instructions 220.

Next, and still referring to FIG. 4, the second scale 240 has overall lateral dimensions that extend from an interior edge 262 to an exterior edge 264. Within those lateral boundaries, second flow rate indicia 242, second major scale increments 246, and second minor scale increments 248 extend longitudinally. More specifically, the second flow rate indicia 242 are disposed between the second major scale increments 246 and laterally offset from the second minor scale increments 248. That is, the major scale increments 246 extend above and below the flow rate indicia 242 while the minor scale increments 248 are disposed between the major scale increments 246 and extend towards a mid-section of the flow rate indicia 242. With this positioning, the flow rate indicia 242 are disposed closest to the exterior edge 264, such that an interior lateral edge 244 of the flow rate indicia 242 is disposed exteriorly of an interior lateral edge 257 of increments 246 and 248. However, to be clear, the interior lateral edge 244 of the flow rate indicia 242 and the interior lateral edge 257 of increments 246 and 248 are both disposed between the overall lateral boundaries of the second scale 240, which are defined by interior edge 262 and exterior edge 264. Thus, the flow rate indicia 242 and the increments (increments 246 and 248) each span a portion (i.e., a subset) of the radial zone defined by the second scale when the second scale 240 is installed in or on a generally cylindrical flow tube 110, with the flow rate indicia 242 spanning a smaller portion than increments 246 and 248.

In the depicted embodiment, the second flow rate indicia 242 are, like the first flow rate indicia 212, numbers representative of a flow rate (e.g., cubic foot per hour (CFH)) of gas moving through a regulator in which the gauge scale assembly 200 is included. In fact, in some embodiments, the flow rate indicia 242 are alphanumerically identical to the first flow rate indicia 212 (i.e., the same numbers, letters, or combinations thereof). However, in other embodiments, the first flow rate indicia 212 of the first scale 210 includes a first range of values incremented at a first interval and the second flow rate indicia 242 of the second scale 240 includes a second range of values incremented at a second interval. For example, the first flow rate indicia 212 may be incremented at increments suitable for a first gas or first combination of gases and the second flow rate indicia 242 may be incremented at increments suitable for a second gas or second combination of gases. Additionally or alternatively, the second flow rate indicia 242 may be positioned in the same positions or different positions as compared to the first flow rate indicia 212.

Similarly, the major scale increments 246 and the minor scale increments 248 may be similar to, different from, or identical to increments 216 and 218 of the first scale 210 (e.g., the same line thickness but spaced differently). Thus, in the depicted embodiment, the major scale increments 246 and the minor scale increments 248 extend transversely with respect to the lateral edges 262 and 264 of the second scale 240, with the major scale increments 246 being thicker than the minor scale increments 248 in the depicted embodiment (like increments 216 and 218 of the first scale 210). Thus, again, the flow rate indicia 242 are relatively uncluttered or unobstructed and easy to read, at least because the flow rate indicia 242 are between and beside the major scale increments 216 and the minor scale increments 218 (instead of having an increment line extend through or on both sides of the flow rate indicia 242). However, in the depicted embodiment, increments 246 and 248 are not identical to increments 216 and 218 at least because increments 246 and 248 have different spacing than increments 216 and 218 (as is most noticeable at a top of scales 210 and 240).

The second scale 240 is further similar to the first scale in that it includes a baseline 256 from which increments 246 and 248 extend. However, notably, second scale 240 is not a patterned and offset version of first scale 210; instead, second scale 240 is—to the extent it is similar to scale 210—a mirrored version of scale 210. Thus, baseline 256 is proximate to the baseline 226 of the first scale 210. In fact, a label 258 included on or connected to baseline 256 may extend even further towards the first scale and the distance between the label 258 of the second scale 240 and the label 228 of the first scale 210 may define an offset between the first scale 210 and the second scale 240. Like label 228, label 258 provides an indication of the gas for which the scale 210 is intended (e.g., Argon). Again, the text of label 258 is arranged longitudinally on the second scale 240 (e.g., a reading direction of the label 258 is parallel to the direction in which the lateral edges 262 and 264 of the second scale 240 extend. This ensures that the second scale 240 can be contained in a small lateral space (e.g., a small radial zone once the scale 240 is applied to a generally cylindrical flow tube 110). By comparison, reading instructions 250 included on or with the second scale 240 are oriented in an orientation that matches an orientation of the second flow rate indicia 242 to ensure that the instructions are clear and easy to read (like reading instructions 220).

As mentioned above, the reading instructions 250 of the second scale 240 may include text 222 disposed beside baseline 256 and, thus, any description of text 222 included above should be understood to apply to reading instructions 250 and reading instructions 220. Additionally, like reading instructions 220, reading instructions 250 also include a symbol 254 above the flow rate indicia 242, the major scale increments 246, and the minor scale increments 248. Again, the symbol 254 provides a pictorial version of the text 222, with a circle disposed below a line representing the way in which the second scale 240 should be read. However, in other embodiments, reading instructions 250 could include any text or symbol located in any location, either in addition to or in lieu of the depicted reading instructions 250.

Figure 5A:
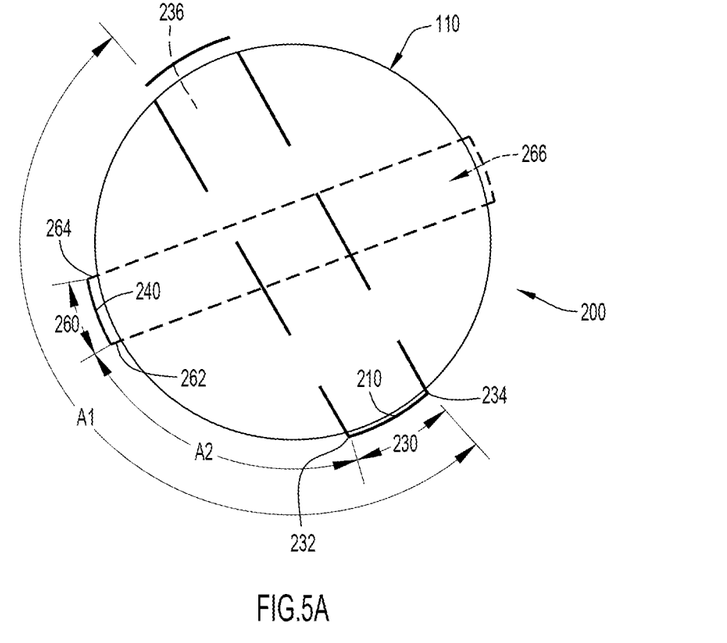
FIG. 5A is a top, schematic view of the flow gauge scale assembly FIG. 4 while installed in a generally cylindrical flow tube.
Figure 5B:
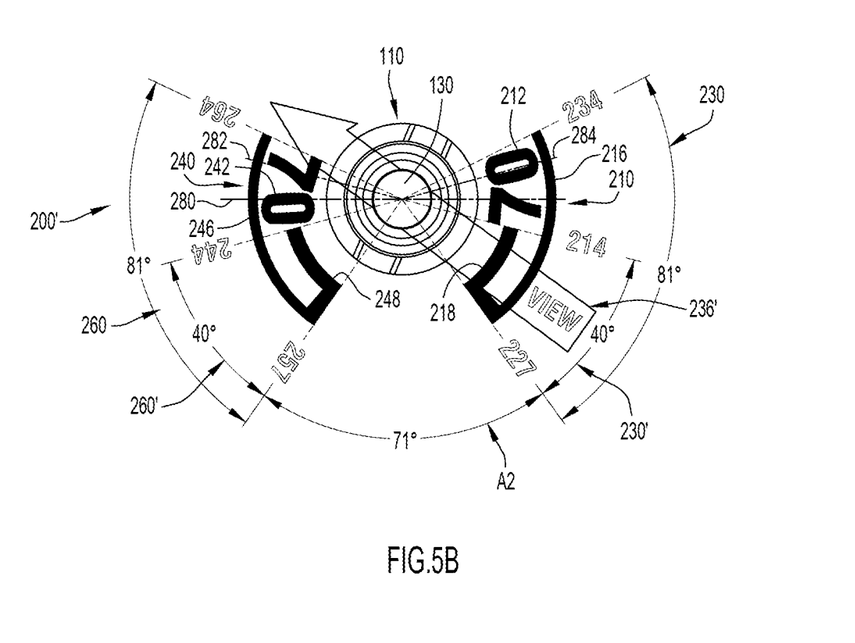
FIG. 5B is a top, schematic view of another flow gauge scale assembly formed in accordance with the present application, while installed in a generally cylindrical flow tube.
Figure 6:
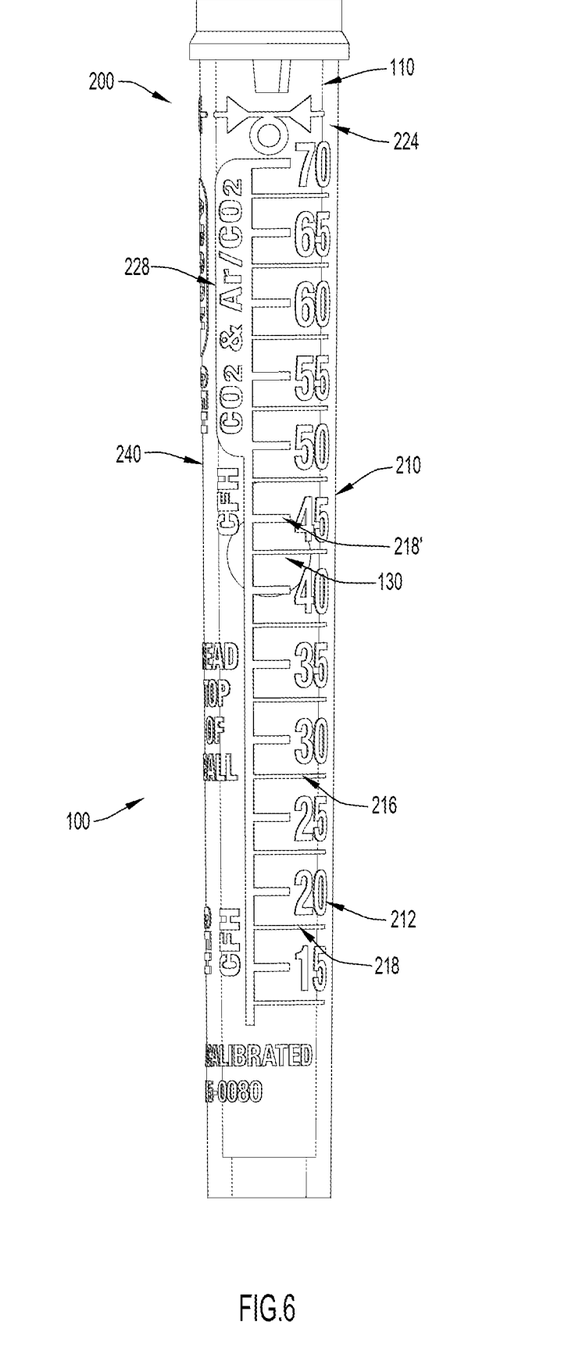
FIG. 6 is a front view of the flow gauge scale assembly of FIG. 4 while installed in a generally cylindrical flow tube, according to an example embodiment.

Now turning to FIGS. 5A, 5B, and 6, but with continued reference to FIG. 4, when the gauge scale assembly 200 is installed in or on a generally cylindrical flow tube 110, the lateral dimensions of the first scale 210 and the lateral dimensions of the second scale 240 define a first radial zone 230 and a second radial zone 260, respectively. Critically, the first radial zone 230 is at least partially offset from a line of sight 266 of the second radial zone 260 and, thus, the second radial zone 260 is also at least partially offset from a line of sight 236 of the first radial zone 230. This is depicted schematically in FIGS. 5A and 5B, while FIG. 6 shows the advantages of this offset by way of illustrating an unobstructed first scale 210.

However, before turning to FIGS. 5A, 5B, and 6 in detail, it is important to understand how the terms "line of sight," "direct field of view," "optically out of phase," "optically misaligned," and the like are used in this application. For the purposes of this application, the "line of sight" or "direct field of view" of a radial zone is the area that would be directly across a cylinder (or circle) from a radial zone when the radial zone is viewed "head on." That is, the "line of sight" or "direct field of view" of a radial zone is the area that would be directly behind a radial zone when viewed from a viewing angle that is approximately transverse to the radial zone and from a position that is approximately centered with respect to the radial zone. This definition is clearly depicted by the straight dashed lines (which represent "lines of sight" or "direct fields of view") traversing the circle representing generally cylindrical flow tube 110. Notably, the field of view/line of sight lines extend directly across the generally cylindrical flow tube 110 from the lateral edges of each radial zone. Thus, for the purposes of this application, if a first scale is "optically out of phase," "optically misaligned," or otherwise out of view of a second scale, or vice versa, these phrases should be construed in accordance with the foregoing definition of line of sight/direct field of view.

With that in mind, FIG. 5A illustrates how the first scale 210 can be positioned in a first radial zone 230 that is at least partially offset from a line of sight 266 of the second radial zone 260. In turn, this ensures that the second scale 240 is be positioned in a second radial zone 260 that is at least partially offset from a line of sight 236 of the first radial zone 230. As can be seen, to achieve these offsets, the exterior edge 234 of the first scale 210 and the exterior edge 264 of the second scale 240 may both be disposed with an overall radial space A1 of approximately 180 degrees or less, such as between approximately 30 degrees and approximately 150 degrees. When the overall radial space A1 is 180 degrees or less and the exterior edges 234, 264 of scales 210, 240 are both disposed within the overall radial space A1, by definition, neither scale can have a line of sight that overlaps the line of sight of the other scale. That is, the first scale 210 will be angularly offset from the line of sight 266 of the second scale 240 and the second scale 240 will be angularly offset from the line of sight 236 of the first scale (e.g., line of sight 236 will be unable to overlap radial zone 260 and line of sight 266 will be unable to overlap radial zone 230).

Alternatively, from another perspective, the line of sight offsets can be achieved by spacing the interior edge 232 of the first scale 210 from the interior edge 262 of the second scale 240 by an offset angle A2 that prevents overlap. The offset angle A2 can be in a range of approximately zero degrees to approximately 160 degrees, zero degrees to approximately 120 degrees, 30 degrees to approximately 150 degrees, or any other suitable range, depending on the widths (lateral dimensions) of the scales 210 and 240.

However, to be clear, the first scale 210 and the second scale 240 need not be disposed within an overall radial space A1 that is equal to or less than 180 degrees measured in a single direction and; instead, the overall radial space A1 can be measured in either direction. For example, the overall radial space A1 can positive 180 degrees (e.g., clockwise) or negative 180 degrees (e.g., counter-clockwise) so that the second scale 240 can be on either side of the line of sight 236 of the first scale. Likewise, the offset angle A2 can be measured in either direction.

Moreover, although FIG. 5A depicts the second scale 240 being completely radially offset from the line of sight 236 of the first scale 210 (i.e., fully optically out of phase, fully optically misaligned, etc.), in other embodiments, the second scale 240 may be partially radially offset from the line of sight 236 of the first scale 210 (and vice versa). For example, in some embodiments, only the radial zones spanning flow rate indicia 212 of the first scale 210 (e.g., a zone spanning from interior lateral edge 214 to exterior edge 234) and flow rate indicia 242 of the second scale 240 (e.g., a zone spanning from interior lateral edge 244 to exterior edge 264) may be optically misaligned from components or features of the opposite scale. As another example, in some embodiments, only the radial zones spanning flow rate indicia (e.g., indicia 212 or 242) and increments (e.g., increments 216 and 218 or increments 246 and 248) of a scale may be optically misaligned from components or features of the opposite scale. That is, a zone of the first scale 210 spanning from interior lateral edge 227 to exterior edge 234 and a zone of the second scale 240 spanning from interior lateral edge 257 to exterior edge 264 may be optically misaligned. Yet another example is discussed below in connection with FIG. 5B. However, in any of these examples, labels 228 and 258 of the scales 210 and 240 may be optically aligned (i.e., not optically out of phase); however, this alignment may be of minimal importance since these labels do not affect the gauge's readability. Also, at least because the ball 130 need not be seen through labels 228 and 258 (in stark contrast with a majority of scales 210 and 240), the labels 228 and 258 may be printed with negative print (white letters on a black background) to mitigate the effect of optical alignment.

Now turning to FIG. 5B, as mentioned, this Figure further illustrates how the first scale 210 can be positioned to be at least partially optically offset from the second scale 240, albeit from a different perspective and with a different optical offset as compared to FIG. 5A—partial instead of complete or full. More specifically, in terms of perspective, FIG. 5A depicts a generally cylindrical flow tube 110 with the various markings of a flow gauge scale assembly 200' (e.g., flow rate indicia and increment markings) removed therefrom and graphically illustrated in radial areas over which the markings might extend when installed on the generally cylindrical flow tube 110. Then, example, and non-limiting, angular measurements are included exteriorly of these graphically illustrated markings.

Next, in FIG. 5B, the flow gauge scale assembly 200' includes a first scale 210 that is partially offset from the second scale 240, and vice versa. This is because the minor increments 218 of the first scale 210, as well as any portions of major increments 216 longitudinally aligned therewith (i.e., disposed directly above or below the minor increments 218), are optically offset from scale 240, as illustrated via view 236'. Likewise, although a view of the minor increments 248 of the second scale 240 is not illustrated in FIG. 5B, the minor increments 248, as well as any portions of major increments 246 longitudinally aligned therewith (i.e., disposed directly above or below the minor increments 248), are optically offset from scale 210. However, in FIG. 5B, the flow rate indicia 212, as well as portions of major increments 216 longitudinally aligned therewith, are optically aligned with (i.e., not optically offset from) scale 240. The flow rate indicia 242, as well as portions of major increments 246 longitudinally aligned therewith, are also optically aligned with scale 210. Thus, a first axis 280 extends through the flow rate indicia 212 and the flow rate indicia 242. Moreover, in some embodiments, the first scale 210 and the second scale 240 are positioned such that a second axis 282 extending between the first flow rate indicia 212 and the minor scale increments 218 extends through the second flow rate indicia 242 and/or a third axis 284 extending between the second flow rate indicia 242 and the minor scale increments 248 extends through the first flow rate indicia 212.

Put another way, in FIG. 5B, the offset radial zones are a first radial zone 230' that spans a portion of the first scale 210 a second radial zone 260' that spans a portion of the second scale 240. The first radial zone 230' of the first scale 210 extends from the interior lateral edge 227 of first scale 210 to the interior lateral edge 214 of the flow rate indicia 212. Meanwhile, the second radial zone 260' extends from the interior lateral edge 257 to the interior lateral edge 244 of the flow rate indicia 242. In the depicted embodiment, the first radial zone 230' and the second radial zone 260' each span approximately 40 degrees (as illustrated) and are separated by an offset angle A2 of approximately 71 degrees, creating a total angular span between lateral edges 214 and 224 spanning approximately 151 degrees. Then, the indicia of each scale—indicia 212 and 242—each extend approximately 41 degrees past this total angular span to lateral edges 234 and 264, respectively, such that the overall radial dimension of the gauge scale assembly 200 is greater than 180 degrees (e.g., approximately 233 degrees). Consequently, the scales partially overlap optically (e.g., the areas beyond a 180 degree angular expanse).

To reiterate, the dimensions shown in FIG. 5B are merely examples and, in other embodiments, these dimensions can vary across different ranges (such as the ranges discussed above in connection with FIG. 5A) to provide scales that are at least partially optically misaligned. Regardless, when increment lines in each scale (or at least portions thereof) are optically offset from components/features of another scale, the flow gauge scale assembly 200' can be easily and accurately read. That is, the partial offset of flow gauge scale assembly 200' enables a ball 130 to be clearly and accurately be matched against increment lines when the ball 130 floats within a generally cylindrical flow tube 110 including flow gauge scale assembly 200', without cluttering or obstruction obscuring the increment lines. Thus, flow gauge scale assembly 200' can be read easily and accurately and will realize the advantages discussed in this application.

FIG. 6 illustrates how positioning the first scale 210 in a first radial zone 230 that is at least partially offset from a line of sight 266 of the second radial zone 260 provides clean, legible, and unobstructed first scale 210 that is easy to read. Notably, the second scale 240 is not visible behind the first flow rate indicia 212 and is not visible behind at least a portion of (if not the entirety of) the major scale increments 216 and the minor scale increments 218. Thus, when the ball 130 floats through the generally cylindrical flow tube 110 in response to gas flowing along gas flow path 50 (i.e., when the ball 130 is forced upwards by the flow of gas), a user can clearly see which increment (of increments 216 and 218) the top of the ball 130 is aligned with (per reading instructions 220, such as symbol 224) and can clearly read the flow rate indicia 212 associated therewith. In the depicted embodiment, the top of the ball is clearly aligned with minor scale increment 218', indicating that the gas flow is flowing through the generally cylindrical flow tube 110 of the flow gauge 100 at a flow rate of 45 CFH.

Figure 7:
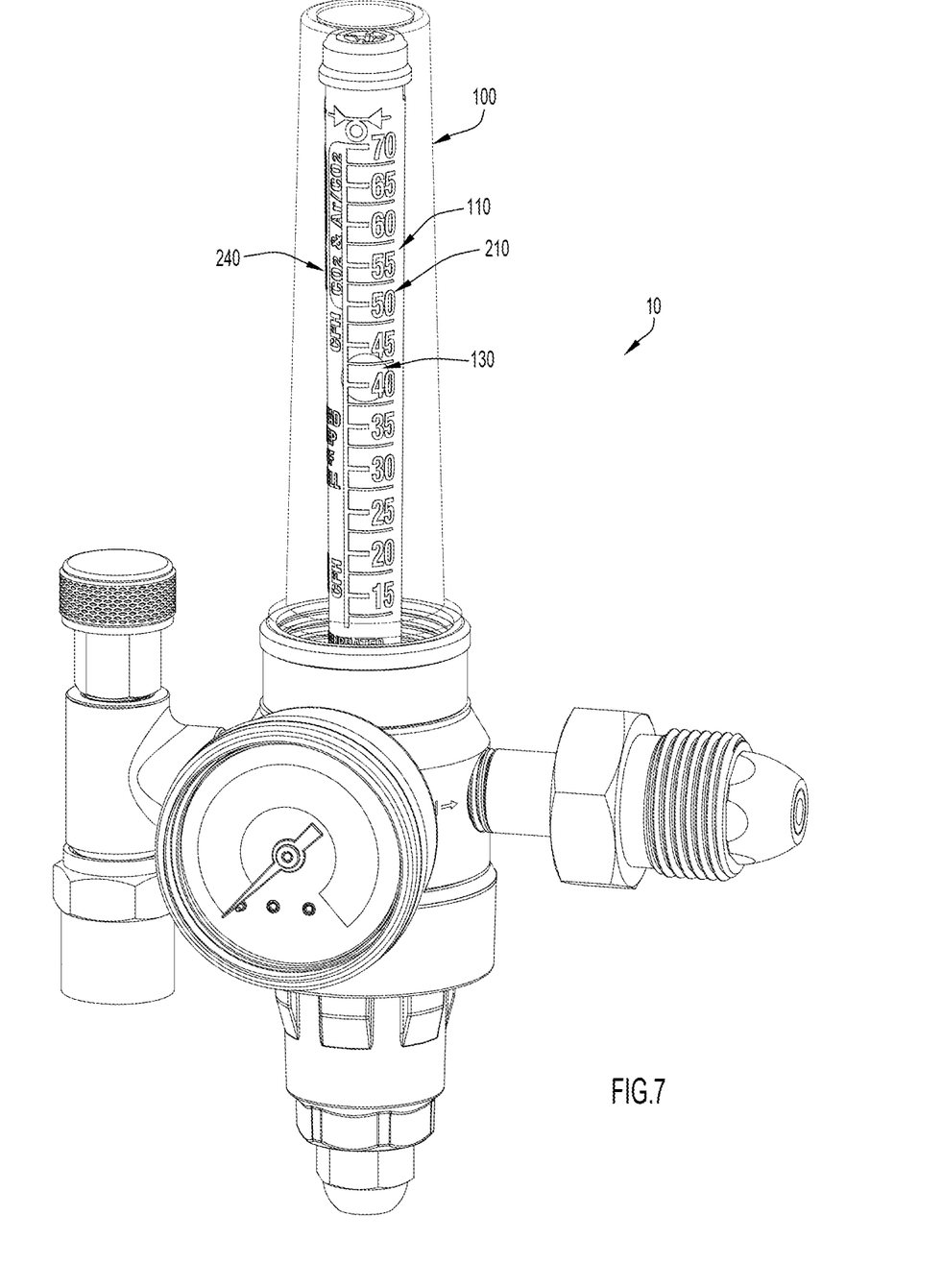
FIG. 7 is a front perspective view of the flow gauge regulator of FIG. 1 taken from a head-on perspective of a first scale included in the flow gauge scale assembly.
Figure 8:
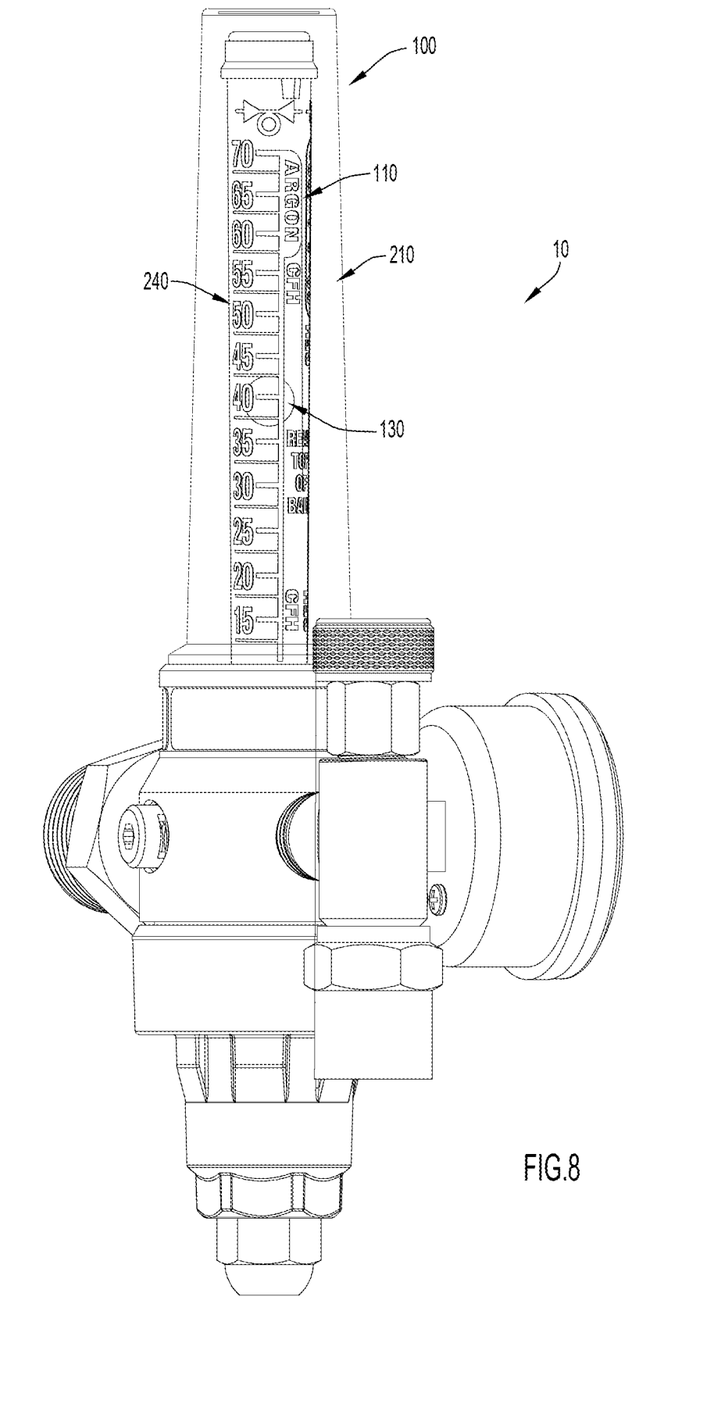
FIG. 8 is a back perspective view of the flow gauge regulator of FIG. 1 taken from a head-on perspective of a second scale included in the flow gauge scale assembly.

Now turning to FIGS. 7 and 8, these two figures depict the flow gauge 100, including gauge scale assembly 200, while installed on regulator 10. As can be seen in FIG. 7, which is a front perspective view of the regulator 10, from a first viewing angle, the flow gauge 100 provides an unobstructed, or at least partially unobstructed, first scale 210 on which the flow rate of a gas flow can be clearly, quickly, and accurately read by matching the top of the ball 130 against increments included thereon. Moreover, and as can be seen in FIG. 8, which is a rear perspective view of the regulator 10, from a second viewing angle, the flow gauge 100 provides an unobstructed, or at least partially unobstructed, second scale 240 on which the flow rate of a gas flow can be clearly, quickly, and accurately read by matching the top of the ball 130 against increments included thereon. As has been repeatedly mentioned herein, scale 210 and 240 are unobstructed, or at least partially unobstructed, because scale 210 and 240 are positioned on the generally cylindrical flow tube 110 of the flow gauge 100 to be optically out of phase (i.e., optically misaligned), or at least partially optically out of phase.

Although the techniques are illustrated and described herein as embodied in one or more specific examples, the specific details of the examples are not intended to limit the scope of the techniques presented herein, since various modifications and structural changes may be made within the scope and range of the invention. In addition, various features from one of the examples discussed herein may be incorporated into any other examples. Accordingly, the appended claims should be construed broadly and in a manner consistent with the scope of the disclosure.

It is also to be understood that the flow gauge scale and regulator described herein, or portions thereof, may be fabricated from any suitable material or combination of materials, such as plastic, foamed plastic, wood, cardboard, pressed paper, metal, supple natural or synthetic materials, and combinations thereof. Suitable plastics may include high-density polyethylene (HDPE), low-density polyethylene (LDPE), polystyrene, acrylonitrile butadiene styrene (ABS), polycarbonate, polyethylene terephthalate (PET), polypropylene, ethylene-vinyl acetate (EVA), or the like. Suitable foamed plastics may include expanded or extruded polystyrene, expanded or extruded polypropylene, EVA foam, derivatives thereof, and combinations thereof.

Moreover, it is to be understood that terms such as "left," "right," "top," "bottom," "front," "rear," "side," "height," "length," "width," "upper," "lower," "interior," "exterior," "inner," "outer" and the like as may be used herein, merely describe points of reference and do not limit the present invention to any particular orientation or configuration. Further, the term "exemplary" is used herein to describe an example or illustration. Any embodiment described herein as exemplary is not to be construed as a preferred or advantageous embodiment, but rather as one example or illustration of a possible embodiment of the invention.

Similarly, when used herein, the term "comprises" and its derivations (such as "comprising", etc.) should not be understood in an excluding sense, that is, these terms should not be interpreted as excluding the possibility that what is described and defined may include further elements, steps, etc. Meanwhile, when used herein, the term "approximately" and terms of its family (such as "approximate," etc.) should be understood as indicating values very near to those which accompany the aforementioned term. That is to say, a deviation within reasonable limits from an exact value should be accepted, because a skilled person in the art will understand that such a deviation from the values indicated is inevitable due to measurement inaccuracies, etc. The same applies to the terms "about" and "around" and "substantially."

I claim:

1. A flow gauge comprising:
    a generally cylindrical flow tube that extends from a first end to a second end, the first end being fluidly coupled to a flow path through a regulator or flowmeter;
    a ball that is movable within the generally cylindrical flow tube in response to a flow of gas moving along the flow path;
    a first scale disposed on the generally cylindrical flow tube, wherein the first scale comprises first increments and first flow rate indicia; and
    a second scale disposed on the generally cylindrical flow tube, wherein the second scale comprises second increments and second flow rate indicia, the first scale and the second scale are offset with respect to a radial zone of the generally cylindrical flow tube such that a first axis extends through the first increments of the first scale, a centroid of a cross-section of the generally cylindrical flow tube taken along a plane defined by radii of the generally cylindrical flow tube, and the radial zone, the radial zone being devoid of any markings and being transparent, and the first scale and the second scale are positioned with respect to one another such that a second axis extends through the first flow rate indicia of the first scale, the centroid of the cross-section of the generally cylindrical flow tube, and the second flow rate indicia of the second scale,
    wherein the first flow rate indicia of the first scale are identical to the second flow rate indicia of the second scale.

2. The flow gauge of claim 1, wherein an interior edge of the first flow rate indicia of the first scale is angularly offset around the generally cylindrical flow tube from an interior edge of the second flow rate indicia of the second scale by an angle in a range of approximately 30 degrees to approximately 150 degrees.

3. The flow gauge of claim 1, wherein the first scale is for a first gas or first combination of gases and the second scale is for a second gas or second combination of gases.

4. The flow gauge of claim 1, wherein the first scale and the second scale are included on a translucent applicator.

5. The flow gauge of claim 4, wherein the translucent applicator comprises an insert that is rotatable within the generally cylindrical flow tube.

6. The flow gauge of claim 4, wherein the translucent applicator is fixed to the generally cylindrical flow tube.

7. The flow gauge of claim 1, wherein the first increments of the first scale comprise:
    first major scale increments; and
    first minor scale increments, wherein the first flow rate indicia are disposed between the first major scale increments and laterally offset from the first minor scale increments.

8. The flow gauge of claim 7, wherein the first major scale increments and the first minor scale increments are configured to provide a flow reading when a top of the ball is aligned therewith.

9. The flow gauge of claim 7, wherein the second increments of the second scale further comprise:
    second major scale increments; and
    second minor scale increments, wherein the second flow rate indicia are disposed between the second major scale increments and laterally offset from the second minor scale increments.

10. The flow gauge of claim 7, wherein the first scale further comprises:
  first reading instructions that are oriented in an orientation that matches an orientation of the first flow rate indicia.

11. The flow gauge of claim 10, wherein the first reading instructions comprise:
  text positioned between the first scale and the second scale; and
  one or more first symbols positioned above the first flow rate indicia, the first major scale increments, the first minor scale increments, or a combination thereof.

12. The flow gauge of claim 11, wherein the second scale includes second reading instructions comprising:
  the text positioned between the first scale and the second scale; and
  one or more second symbols positioned above the second flow rate indicia included in the second scale, second major scale increments included in the second scale, second minor scale increments included in the second scale, or a combination thereof.

13. The flow gauge of claim 1, wherein the first scale and the second scale are positioned with respect to one another such that a third axis extends between the first increments and the first flow rate indicia of the first scale, through the centroid of the cross-section of the generally cylindrical flow tube, and through the second flow rate indicia of the second scale.

14. A flow gauge scale assembly comprising:
  a first scale disposed in a first radial position on a generally cylindrical flow tube through which a ball can move to indicate a flow rate of a flow of gas, wherein the first scale comprises first increments and first flow rate indicia; and
  a second scale disposed in a second radial position that will be at least partially optically misaligned from the first scale in an installed configuration of the flow gauge scale assembly in the generally cylindrical flow tube, wherein the second scale comprises second increments and second flow rate indicia, the first scale and the second scale are offset with respect to a radial zone of the generally cylindrical flow tube such that a first axis extends through the first increments of the first scale, a center of a cross-section of the generally cylindrical flow tube taken along a plane defined by radii of the generally cylindrical flow tube, and the radial zone, wherein the radial zone lacks any markings and is transparent, and the first scale and the second scale are positioned with respect to one another such that a second axis extends between the first increments and the first flow rate indicia of the first scale, through the center of the cross-section of the generally cylindrical flow tube, and through the second flow rate indicia of the second scale.

15. The flow gauge scale assembly of claim 14, wherein the first increments of the first scale further comprise:
  first major scale increments; and
  first minor scale increments, wherein the first flow rate indicia are disposed between the first major scale increments and laterally offset from the first minor scale increments, and the first axis extends through the first major scale increments or the first minor scale increments, the center of the cross-section of the generally cylindrical flow tube, and the radial zone.

16. The flow gauge scale assembly of claim 15, wherein the second increments of the second scale further comprise:
  second major scale increments; and
  second minor scale increments, wherein the second flow rate indicia are disposed between the second major scale increments and laterally offset from the second minor scale increments, the first scale and the second scale are positioned with respect to an additional radial zone of the generally cylindrical flow tube such that a third axis extends through the second major scale increments or the second minor scale increments, the center of the cross-section of the generally cylindrical flow tube, and the additional radial zone, and the additional radial zone lacks any markings.

17. The flow gauge scale assembly of claim 16, further comprising scale reading instructions that include:
  text positioned between the first scale and the second scale;
  one or more first symbols positioned above the first flow rate indicia, the first major scale increments, and the first minor scale increments; and
  one or more second symbols positioned above the second flow rate indicia, the second major scale increments, and the second minor scale increments included in the second scale, wherein the text, the one or more first symbols and the one or more second symbols are oriented in an orientation that matches an orientation of the first flow rate indicia and an orientation of the second flow rate indicia.

18. A flow gauge comprising:
  a flow tube through which a gas can flow;
  a first scale disposed in a first radial position on the flow tube, wherein the first scale comprises first increments and first flow rate indicia to indicate a first gas flow rate; and
  a second scale disposed in a second radial position on the flow tube, wherein the second scale comprises second increments and second flow rate indicia to indicate a second gas flow rate, the first scale and the second scale are offset with respect to a radial zone of the flow tube such that a first axis extends through the first increments of the first scale, a center of a cross-section of the flow tube taken along a plane defined by radii of the flow tube, and the radial zone, the radial zone lacking any markings and being transparent, the first scale and the second scale are positioned with respect to one another such that a second axis extends through the first flow rate indicia of the first scale, the center of the cross-section of the flow tube, and the second flow rate indicia of the second scale, and the first scale and the second scale are positioned with respect to one another such that a third axis extends between the first increments and the first flow rate indicia of the first scale, through the center of the cross-section of the flow tube, and through the second flow rate indicia of the second scale.

* * * * *